United States Patent
Loftus et al.

(10) Patent No.: US 9,083,799 B2
(45) Date of Patent: Jul. 14, 2015

(54) WORKFLOW MANAGEMENT IN CONTACT CENTERS

(75) Inventors: Liam Loftus, Galway (IE); Robin Power, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 1197 days.

(21) Appl. No.: 12/168,463

(22) Filed: Jul. 7, 2008

(65) Prior Publication Data

US 2010/0002863 A1      Jan. 7, 2010

(51) Int. Cl.
H04M 3/00          (2006.01)
H04M 5/00          (2006.01)
H04M 3/51          (2006.01)

(52) U.S. Cl.
CPC .......... *H04M 3/5158* (2013.01); *H04M 3/5175* (2013.01)

(58) Field of Classification Search
CPC ........................... H04M 3/5175; H04M 3/5158
USPC ............................. 379/266.08, 265.06, 265.02
See application file for complete search history.

(56) References Cited

U.S. PATENT DOCUMENTS

| | | | |
|---|---|---|---|
| 6,804,346 B1 * | 10/2004 | Mewhinney | 379/265.1 |
| 7,043,008 B1 * | 5/2006 | Dewan | 379/265.06 |
| 2003/0046142 A1 * | 3/2003 | Eitel et al. | 705/11 |
| 2003/0147522 A1 * | 8/2003 | Elazar | 379/265.06 |
| 2007/0174111 A1 * | 7/2007 | Anderson et al. | 705/11 |
| 2008/0063178 A1 * | 3/2008 | Paden et al. | 379/265.06 |
| 2008/0107255 A1 * | 5/2008 | Geva et al. | 379/265.06 |
| 2008/0109268 A1 * | 5/2008 | Ander et al. | 705/7 |

FOREIGN PATENT DOCUMENTS

WO    WO-2004/040889 A      5/2004

OTHER PUBLICATIONS

International Preliminary Report on Patentability in PCT/EP2009/004638.

* cited by examiner

*Primary Examiner* — Sonia Gay
(74) *Attorney, Agent, or Firm* — Maldjian Law Group LLC; John Maldjian; Alexander D. Walter

(57) ABSTRACT

A method, system and computer program product are provided for monitoring a communication session in a contact center. An agent follows a structured workflow while handling the communications session, and trigger events are defined which are associated with significant steps in the workflow other than (or additional to) the connection and disconnection of the agent with the session. When a trigger event is detected indicating that the agent has reached a predefined significant step in the workflow, an event notification issues to another system of the contact center, such as a statistics package, or a supervisor workstation, or an event aggregator which receives such notifications from many agent stations. In a preferred embodiment, these event notifications are used by an automated outbound dialler to more accurately predict the time to the end of a communications session, thereby providing a better outbound dialling algorithm.

17 Claims, 4 Drawing Sheets

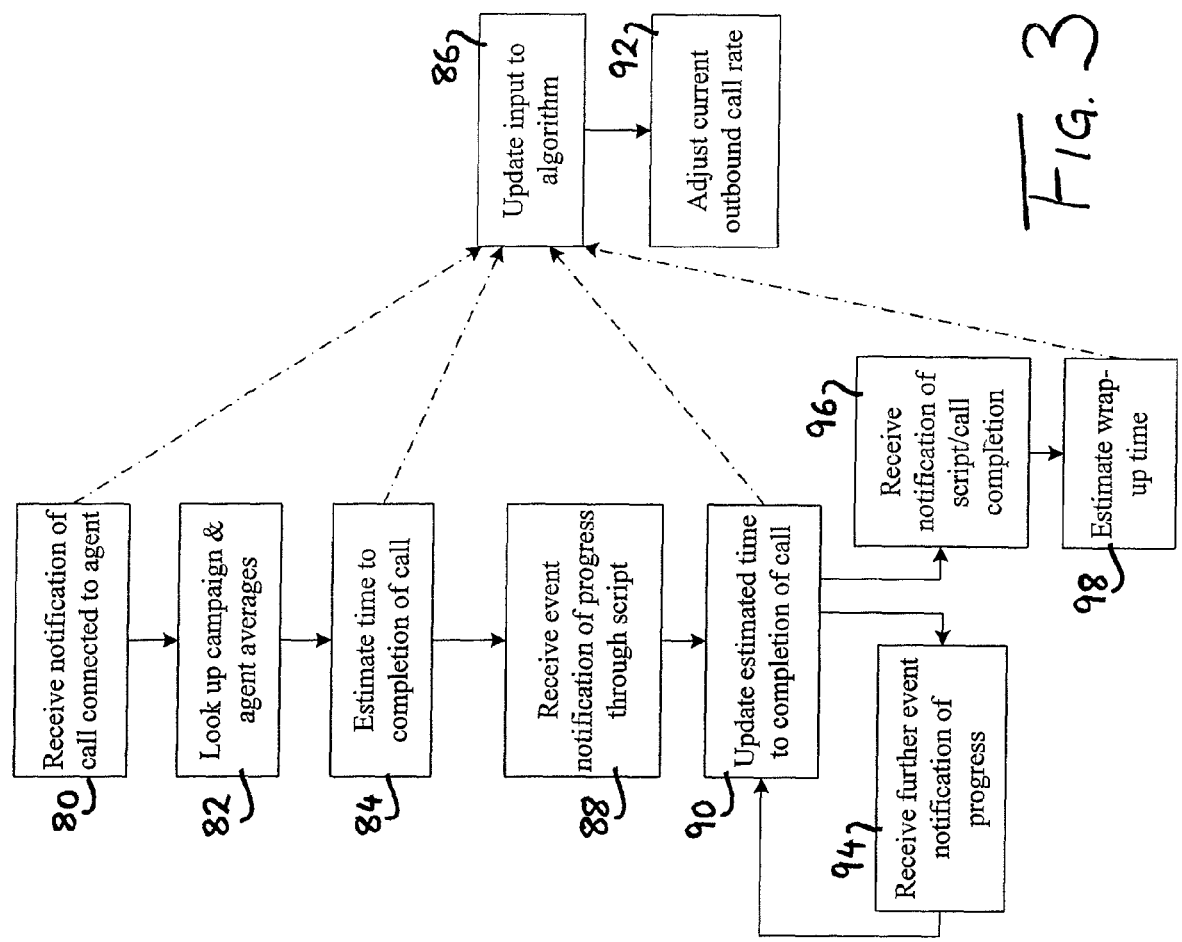

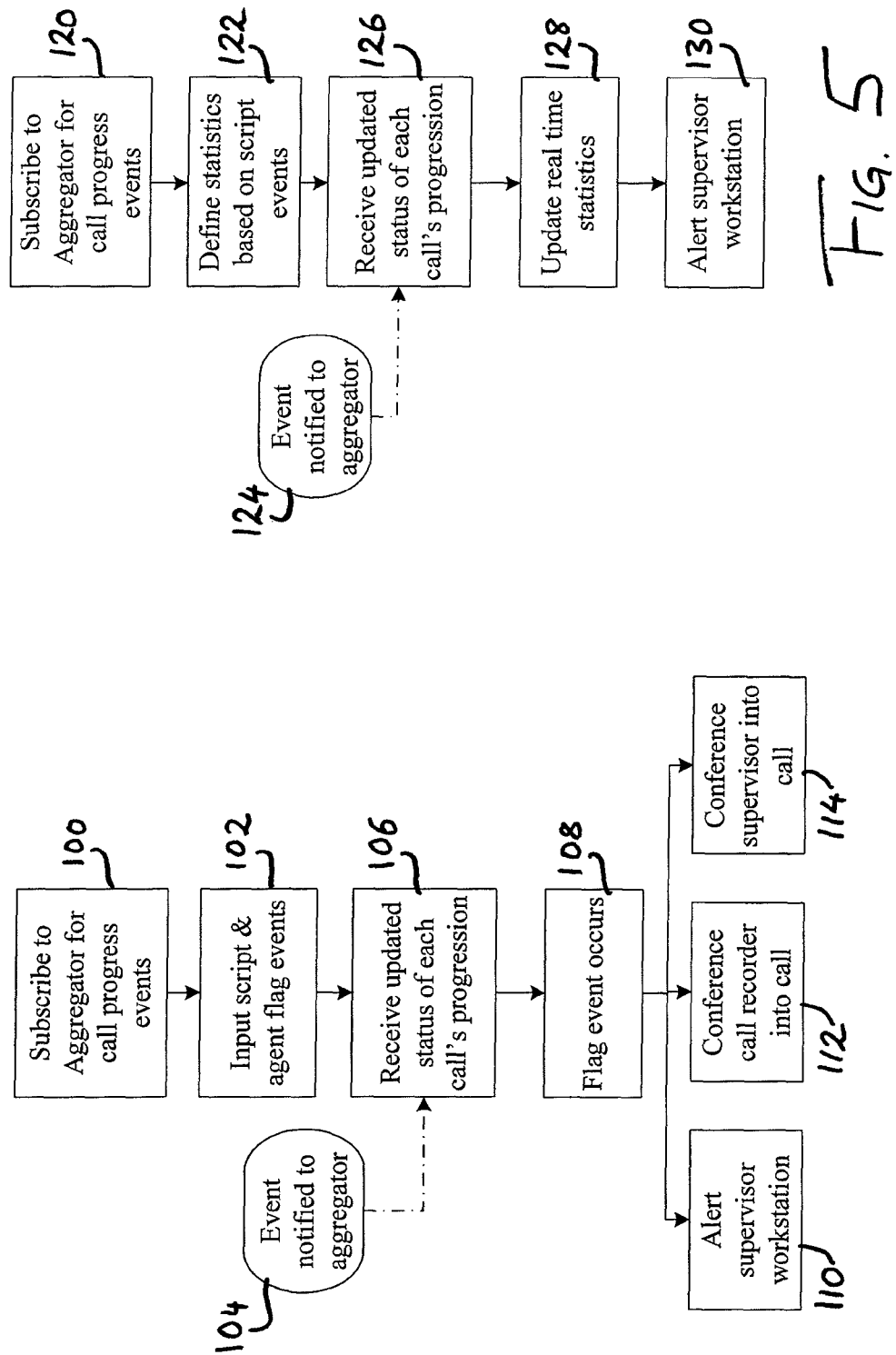

WORKFLOW MANAGEMENT IN CONTACT CENTERS

TECHNICAL FIELD

This invention relates to contact centers and in particular to improvements in workflow management

BACKGROUND ART

The growth of the telemarketing industry in recent years has been phenomenal. More and more companies are employing cold-calling techniques to solicit sales. This is especially true with the growing prevalence of lower carrier rates and the availability of customer lists via dedicated list providers.

With any cold-calling mechanism, efficiency is paramount. Contact centers strive for a high throughput of calls in the expectation of sales. Outbound diallers for contact centers have evolved in recent years from manual based preview diallers to more advanced predictive dialling systems. Basic outbound applications offer a contact to an agent allowing them to manually dial customers or offering them the option to cause the system to automate the dialling task on behalf of the agent. This preview or progressive method is inefficient for many reasons: the agent's time is spent waiting for customers to answer; the agent must listen to tones to determine how an unsuccessful dialling attempt should be characterised and recorded i.e. "Ring No Answer", "Busy", "Wrong Number" etc. Because the agent is in control of the timing of the call and its release, there can be performance issues.

More modern progressive diallers are implemented in many large contact centers. In these contact centers, a dialler application calls the customer and has the capability of detecting the progress of the call attempt without human input. In the event of a live customer answering the call, it gets offered to an agent, thus eliminating the offering of failed calls to agents. These systems contain a "Predictive Algorithm" which forecasts when an agent is likely to become available to take a call and tries to have a live customer reached as an agent becomes available. In this way, the dialler can pace outbound call initiation attempts accordingly to maximise the talk-time of the agent.

Predictive algorithms use a combination of historical information and current agent talktime as well as failed call rates to "predict" how frequently calls need to be made to eliminate agent idle time. Inevitably however, some algorithms either dial customers too frequently meaning there are no agents available ("abandoned calls") to take the call or too infrequently leaving agents idle. Regional regulations define the permitted abandoned call rates on outbound campaigns and impose severe penalties for breaches. It is therefore crucial that the algorithm paces calls within the regulatory tolerances.

Current predictive algorithms retain historical information about campaigns and adjust to the current agent talk-time. For example, if a predictive outbound dialling campaign targeted retired people in a given area for telemarketing sales of home insurance and found that the average talk time of an agent was 2.5 minutes per call, it would infer that future calls of the same campaign would take the same time. This mechanism however does not take account of calls which have a higher variance from average talk-time. A short call could occur when a prospective customer is not interested, while a longer call could occur when there is interest or a quotation is being prepared. Other factors such as average wrap-up time are also used today by predictive algorithms, again based on historical information.

DISCLOSURE OF THE INVENTION

The invention provides, in a first aspect, a method of monitoring a communication session in a contact center, the method involving the steps of:
    providing at an agent station of the contact center a structured workflow for use by an agent in progressing the communication session in a structured fashion;
    defining one or more trigger events associated with steps in the structured workflow other than the connection and disconnection of the communication session;
    during a communication session involving the agent station, monitoring the progress of the communication through the structured workflow to thereby detect the occurrence of one of the trigger events; and
    upon detection of the one of the trigger events, issuing an event notification identifying the trigger event to an event-receiving service of the contact center which has been configured to receive such event notifications.

The use of a workflow with specified trigger events associated with the structure of the workflow leads to several advantages, all based on the addition of real knowledge to the systems of the contact center as to how a communications session is progressing. For example, such information can lead to improved predictive dialling rates, better targeting of relevant calls for monitoring and supervision, better "on-the-fly" tailoring of workflows and scripts, and more accurate real-time statistics generation.

Improved Predictive Algorithm: If the agent is completing the answer to question 5 of 10, then it is a reasonable assumption that they are 50% of the way through the call. The predictive algorithm can use this as a further input to determining when calls are to be placed reducing the occurrence of abandoned calls and maximising agent productivity.

Quality Monitoring: For example, the agent scripts defined by the supervisor may "branch" to a number of questions/sections depending on the outcome of a call. Statistically, 40% of calls following a certain path through the script might result in a sale. However, for a specific agent, the same path may lead to only a 10% sales ratio. The real-time workflow information could be used to trigger notification for either call recording or quality monitoring (supervisor listen-in) when the same path is reached on a subsequent call. This would be significantly more efficient than a "blind" listen-in by the supervisor than waiting for similar call outcome to determine the root cause of lower sales ratios. Remedial action could be taken in near real-time (supervisor interruption) rather than retrospective action (performance appraisal after listening to a large quantity of unfiltered call recordings). Current agent monitoring solutions focus on either a complete or random call recording or supervisor listen-in. By having an automated agent determine the relevant calls for a supervisor to listen-into, the supervisor's time is maximised in resolving the agent training issues than identifying them in the first place.

Better tailoring of workflows and script: the impact to changes in call strategies can be measured in real-time e.g. if lowering the price of widgets brings customers further into the sales process but there may still be customer resistance with other sales aspects (delivery, subscriptions etc), the supervisors have more visibility in real time to how changes impact the sales campaign.

Real Time Statistics: rather than gathering statistics at call wrap-up time only, the statistical information can be gathered throughout a call and presented live to supervisors.

Preferably, the monitoring of the progress of the communication comprises detecting inputs from an agent at the agent station.

The inputs can be detected from the content of the communications session, or alternatively, the inputs can be detected from an interaction of the agent with a workflow application interface provided at the agent station.

In one embodiment, the event-receiving service receives the event notifications from a plurality of agent stations and makes the event notifications available to other contact center services or entities.

Preferably, the event-receiving service enables the other contact center services or entities to subscribe to receive event notifications which match predetermined criteria.

In this way, an aggregator can collect all of the trigger events from agent stations and then make them available to whichever other entities in the contact center have a use for the notifications, such as monitoring systems, outbound diallers, statistical applications and so on.

The method of the invention preferably also includes the step, taken by an outbound dialler of the contact center, of adjusting an outbound dialling rate in response to the trigger event.

It should be noted that the term "dialler" as used herein does not imply that the communications sessions must be voice telephony calls, though this is the currently most preferred mechanism for contact center outbound campaigns. Outbound sessions could be initiated by such a dialler in the medium of instant messaging, video telephony and so on.

Optionally, the outbound dialler is the event-receiving service of the contact center to which the event notification issues.

Alternatively, and preferably, the outbound dialler communicates with the event-receiving service of the contact center to which the event notification issues.

Preferably, the outbound dialler maintains for the communications session an expected call duration value and the outbound dialler adjusts the expected call duration estimate in response to the progress of the communications session as indicated by the event notification.

Therefore, rather than simply maintaining an average call duration and assuming that all calls will comply with this expected duration, the dialler can track actual progress through the workflow structure and thereby note in real time how close the session is to an expected termination point of the script.

Most preferably, the outbound dialling rate is determined by an algorithm having as an input the expected call duration estimate, whereby adjustment of the expected call duration estimate results in an adjustment of the outbound dialling rate.

Generally, contact centers support agents in outbound campaigns by using agent desktop applications which present a workflow script to the agent at the agent station. This script may contain an introduction, a number of general questions to the customer with form controls for answers and a conclusion. These scripts are supervisor defined to give focus to the call and collect information i.e. surveys, telemarketing, debt collection etc. Often the answers are multiple choices through radio buttons, check boxes or dropdown lists, but they may also be free-form text boxes.

With such scripts, it can be difficult to tell what effect small changes in wording or in script structure might have on sales or other measurable outcomes. Generally, significant monitoring is involved by supervisors to determine what effect such changes might be having, and if the change is a small one in a long script, there can be a high proportion of monitoring required to simply observe the effect of a change.

Another problem, which is experienced in both outbound and inbound contact center environments, is that not all agents perform equally well, and particular agents can be better at some aspects of their work than others. Certain agents may exhibit lower success rates than others, even when working from the same script. It can be found, after monitoring many calls with an agent, that a particular part of a workflow script is causing the difficulty, or it may be found that an agent is particularly successful, compared to his or her peers, in closing a sale once a critical point in the script is reached. In order to witness what contributes to the success or failure of an agent at such a critical point, the supervisor may have to monitor or playback long stretches of irrelevant conversation.

Therefore, where the cumulative sales result from a skillset is at variance from the individual performance of an agent, the real-time desktop information to signal the progress of a call could be used as a trigger for specific agent monitoring treatment i.e. supervisor listen-in. Historical reporting can conclude that across a group of agents reaching a certain point in a script leads to a sale/successful outcome in x% of cases. The performance of individual agents can be compared against this statistic. Where agents are found to be underperforming, a quality monitoring application can take action when the specific agents reach the same point of a script i.e. automatic conference of a supervisor.

Accordingly, the method can also include the step of causing the communications session to be recorded in response to the event notification.

The method can further include the step of conferencing into the communications session a supervisor in response to the event notification.

As an alternative to automatically conferencing in a supervisor, the method can further include the step of issuing an alert at a supervisor station in response to the event notification.

Furthermore, the method can include the step of inputting the event notification into a statistical application which maintains real-time statistics relating to a plurality of contact center communications sessions based on the event notifications.

The invention also provides a computer program product comprising a computer-readable medium encoding instructions which, when executed in a computing system of a contact center, are effective to cause the computing system to carry out the method of the invention as described herein.

The invention further provides a system for monitoring a communication session in a contact center, the system comprising:

a structured workflow provided at an agent station of the contact center for use by an agent in progressing the communication session in a structured fashion, the workflow having identified therein one or more trigger events associated with steps in the structured workflow other than the connection and disconnection of the communication session;

a communication session monitor which is configured to monitor the progress of the communication through the structured workflow to thereby detect the occurrence of one of the trigger events; and an event notification mechanism for issuing an event notification upon detection of the one of the trigger events, identifying the trigger event to an event-receiving service of the contact center which has been configured to receive such event.

In another aspect, the invention provides a method of operating an outbound dialler of a contact center, comprising the steps of:

estimating, for each of a plurality of agent stations of the contact center engaged in respective communication sessions, an expected duration until the agent station becomes free to participate in a subsequent communications session;

maintaining a current rate of initiation of outbound communications sessions according to an algorithm which is adapted to match each successfully completed outbound communications session attempt with a live agent while minimising the idle time of agents between communications sessions, wherein a successfully completed outbound communications session attempt is one in which a live person is contacted;

receiving an event notification indicative of the progress through a structured workflow of a communication session at one of the plurality of agent stations;

adjusting, in respect of the one of the plurality of agent stations, the expected duration until the agent stations becomes free, the adjustment being based on the event notification; and adjusting, in response to the adjustment in expected duration, the current rate of initiation of outbound communications sessions.

A computer program product is also provided which carries out this method when executed in an outbound dialler of a contact center The invention also provides, in this aspect, an outbound dialler of a contact center, comprising:

a processor programmed to estimate, for each of a plurality of agent stations of the contact center engaged in respective communication sessions, an expected duration until the agent station becomes free to participate in a subsequent communications session;

a record maintaining a current rate of initiation of outbound communications sessions according to an algorithm which is adapted to match each successfully completed outbound communications session attempt with a live agent while minimising the idle time of agents between communications sessions, wherein a successfully completed outbound communications session attempt is one in which a live person is contacted;

an interface for receiving an event notification indicative of the progress through a structured workflow of a communication session at one of said plurality of agent stations;

an adjustment program module for adjusting, in respect of said one of said plurality of agent stations, said expected duration until said agent stations becomes free, said adjustment being based on said event notification, and for adjusting, in response to said adjustment in expected duration, said current rate of initiation of outbound communications sessions.

There are a number of mechanisms to implement centralised awareness of workflow progress. Examples of technologies to implement include (but are not limited to) Jabber and use of the Session Initiation Protocol (SIP). In a SIP implementation, SIP Presence could be used as the mechanism for signalling the progress of the agent through the script. In SIP systems, one entity can subscribe to another party for events. The subscribed-to party will notify the subscriber of state changes as they happen. Alternatively, a third party can handle the subscribers and the notifying party can publish their events to the third party.

This allows for centralised handling of subscriptions and events in scenarios where multiple subscribers and notifiers exist. In this solution the notifier is the agent station application which processes the script. The subscriber may be the predictive dialler application or the statistical package. Optionally, the contact center provides an aggregator facilitating a single point of contact for all agents and all such applications if there is more than one. The invention does not require an aggregator and allows (say) the predictive dialler application to subscribe directly to the notifiers.

The agent desktop application will define certain states or trigger events to represent stages of call/script progress. A trigger event will preferably be defined for each state entry. The predictive dialler will have knowledge of these states also. That is, the form of each event is agreed by subscriber and notifier by design. As the agent fills in the script's forms and controls, the notifier component of the agent's desktop application will send notify events matching the state of the call. The subscriber component of the contact center management application can receive the events as aggregator and update its internal statistics for each agent's current state and take necessary action such as updating the predictive algorithm or performing a quality monitoring activity.

By defining a state for each question, the agent's application can advance to a new state as they progress through the call. In a Jabber implementation, streaming messages between the agent's script entity and the contact center management aggregator entity could signal the progression through the call.

BRIEF DESCRIPTION OF THE DRAWINGS

The invention will now be further illustrated by the following description of embodiments thereof, given by way of example only, with reference to the accompanying drawings, in which:

FIG. 3 is a flow chart illustrating the detailed operation of the predictive dialler adjustment method referred to in FIG. 2;

FIG. 4 is a flowchart illustrating an improved method of monitoring agents in a contact centre; and FIG. 5 is a flowchart illustrating an improved method of generating and monitoring contact centre statistics.

DETAILED DESCRIPTION OF PREFERRED EMBODIMENTS

Figure 1:
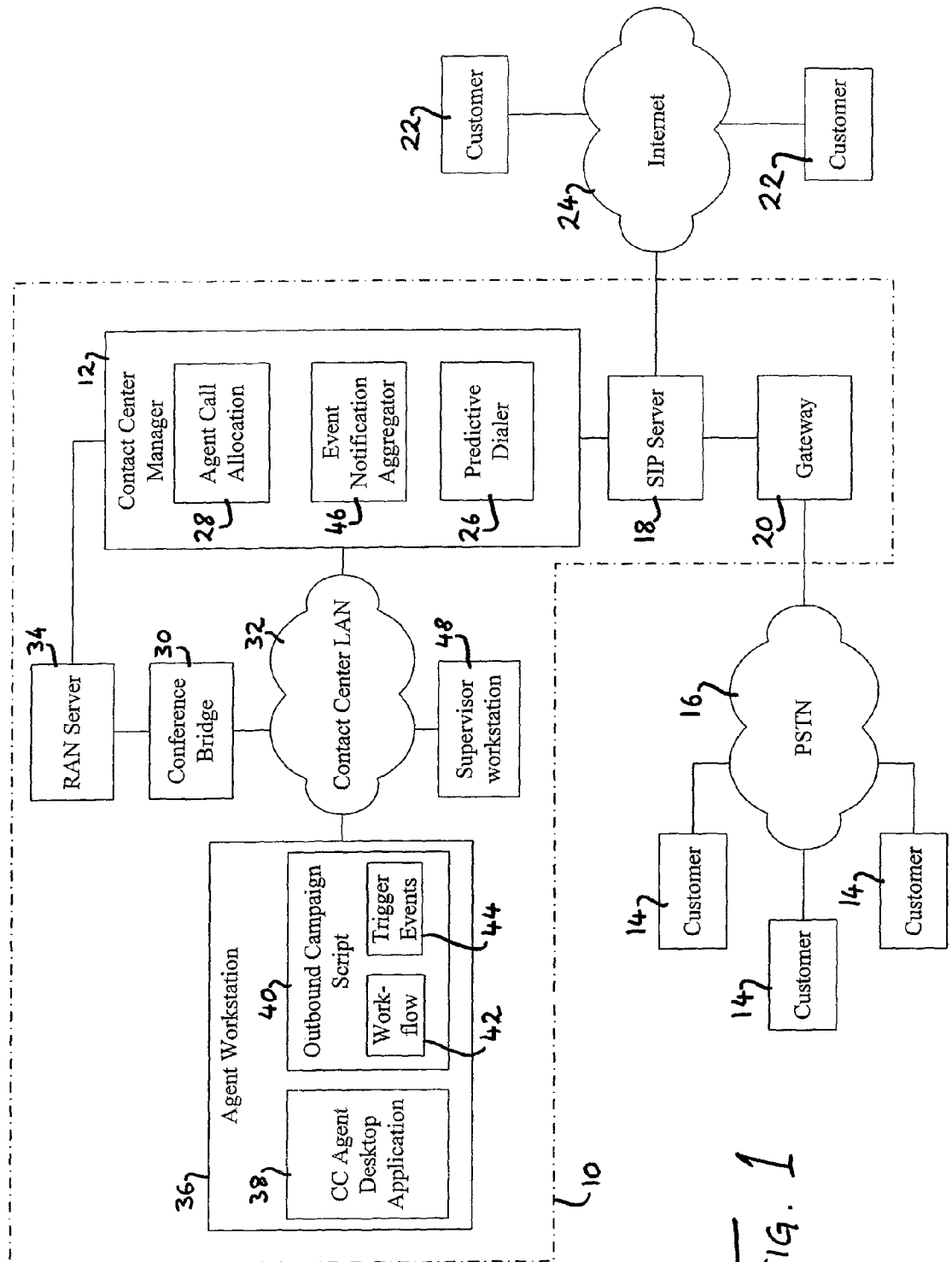
FIG. 1 is a block diagram architecture of a system according to the invention.

In FIG. 1, there is shown a contact centre system, enclosed by broken line 10. The contact centre 10 line allows a contact centre management system or manager 12 to connect to customers 14 via public switch telephone network PSTN 16. Connection is made by means of appropriate telephony equipment, such as the illustrated session initiation protocol (SIP) server 18 and telephony gateway 20. Similarly, customers 22 who are connected to the Internet 24 may be contacted using, for example, the SIP protocol via SIP server 18.

In this way, and is as generally known in the art, a hardware implemented or software-implemented predictive dialler 26 may place multiple calls to a plurality of customers 14, 22. When calls are successfully answered and are determined to be connected to a live customer, an agent call allocation application 28 connects the call to a conference bridge 30 via a contact centre local area network (LAN) 32. Typically, this will occur in the seconds before an agent becomes free, or in a brief idle period allocated to the agent.

A plurality of human agents are provided in the contact centre, but only one agent workstation 36 is shown. The agent workstation is provided with software which runs a contact centre agent desktop application 38, and, in the context of a particular outbound telemarketing campaign, an outbound campaign script 40 is created, and this is running on each agent workstation 36. The agent will be provided with telephony hardware (not shown) which is integrated with the agent desktop application 38, such that the agent call allocation software 28 can "push" a call to the agent workstation, with call details appearing within the agent desktop application 38, and the call being connected to the agent telephony equipment, in a known manner. When a call is connected, the outbound campaign script initialises and operates according to a workflow 42.

Typically, a workflow will present a series of lines to be spoken by the agent, and will provide for different branching outcomes according to the response of the customer. Normally, the goal is to identify customers who are interested in a product or service or who are willing to provide information or participate in research, and to complete the transaction as quickly and efficiently as possible, and the workflow will be tailored to that end.

As the skilled person is aware, the predictive dialler will operate an algorithm which takes account of the number of agents currently active, the number of calls currently in progress, the number of calls currently being dialled, the statistical likelihood of a dialled number giving rise to a live customer interaction, the average idle time allowed for each agent between terminating a call and being presented with the next call, including time for the agent to complete "wrap up", and so on.

While conventional predictive diallers may be aware of the time spent by a particular agent on a call, and may attempt to predict from this the time before the agent is free to accept the next call, based either on a contact centre average, an agent group average, or even an individual agent average time to complete a call in a particular campaign, the system of FIG. 1 provides additional benefits. In particular, the outbound campaign script 40 is designed to notify certain trigger events 44 to an event notification aggregator 46. The aggregator 46 is a service running within the contact centre manager which receives, from each agent workstation, notified trigger events. Other applications and services within the contact centre (or indeed, external to the contact centre) can subscribe to the event notification aggregator in respect of particular classes of events. This allows other components and services in the contact centre to monitor the progress of an agent through a script in a particular call, and to take action in response to the script progress. As an example, a supervisor workstation 48 may subscribe to notifications aggregator 46 to be informed when a particular agent reaches a particular point in a script, where it has been noted that agent is experiencing particular difficulty or is achieving success rates greatly above or below other agents in relation to that point in the script.

Further examples of how the event notification may be used will now be described.

Figure 2:
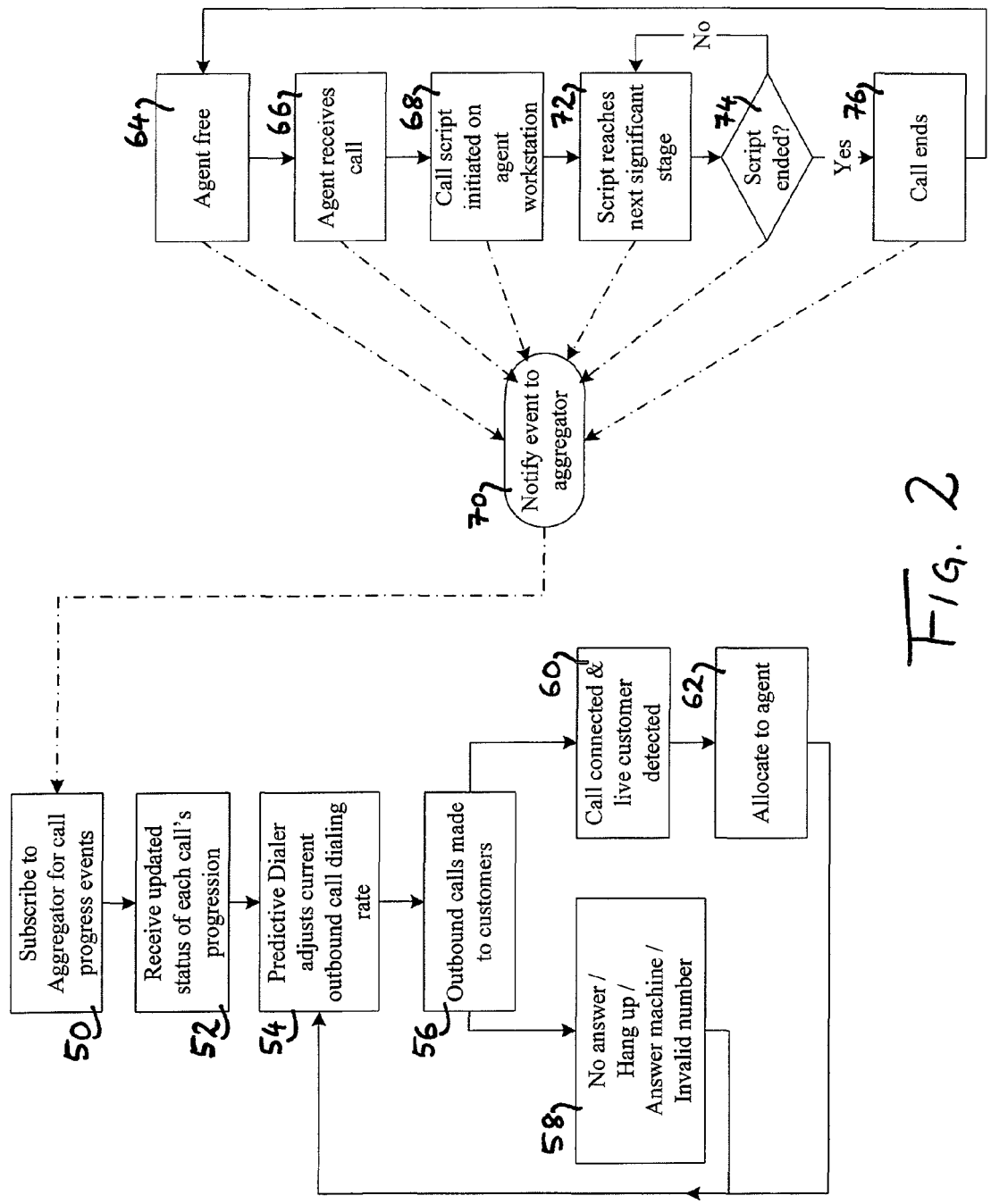
FIG. 2 is a flow chart illustrating an improved method of predictive outbound dialling.

FIG. 2 shows a flowchart of a process involving (generally on the left hand side of FIG. 2) the predictive dialler and (generally on the right hand side of FIG. 2) the agent workstation, with the aggregator providing a link between these entities.

The predictive dialler 26 (FIG. 1) subscribes to the aggregator for call progress events, step 50. As each agent progresses through the script on every call, trigger events 44 are automatically detected by the script 40 and notified to the event aggregator 46, as will be described further below, and thus the predictive dialler receives an updated status of each calls progression, step 52. As will be described further with reference to FIG. 3, the predictive dialler adjusts the current outbound call-dialling rate based on the actual progress of each call, step 54. It will be appreciated that this is a more sophisticated and accurate method of monitoring call progress than estimating the time to completion, since such estimates cannot take account of the difficulty or ease with which an agent is progressing towards a conclusion in the script, and nor can such estimates take account of what branch within the script an agent is currently traversing. Accordingly, as the outbound call dialling rate is adjusted in line with the actual activity of each agent (and thus the expected time for the agent to become free), the predictive dialler makes a certain number of outbound calls to customers, step 56, in order to balance the number of expected live connections with the number of agents becoming free over the same time period.

A certain proportion of these calls will result in non-completion step 58, such as if the call is not answered or the customer hangs up, or an answer machine or invalid number tone is detected. Such non-completions are noted by the predictive dialler in step 54, which adjusts its call rate accordingly. When a call is connected and a live customer is detected, step 60, this call is allocated to an agent by the agent call allocation software 28, step 62. On the agent workstation, step 62 occurs at the point in time when an agent is free, step 64, following which the agent receives the call which has been allocated to it, step 66. Upon receiving the call, a call script is initiated on the agent workstation for the agent to follow in speaking with the customer, step 68.

The event aggregator is notified of each significant step occurring in relation to the agent workstation and in particular, in relation to the agent script. Thus, when the agent became free, this may have been notified, as may the fact that the agent received the call in step 66, as indicated by step 70. When the call script initiated on the agent workstation, this is a significant event and is notified to the aggregator, as it provides a start point for the interaction between the agent and the customer, and this may be of interest to the predictive dialler. Because the dialler subscribes to the aggregator in step 50, all such events are notified to the predictive dialler. As the script progresses, when it reaches the next significant stage, as stored within the script as a trigger event, step 72, that event is also notified to the aggregator, step 70. After each significant event, a check is conducted whether the script has ended, step 74, and if not, the script progresses to the next significant stage, step 72.

In this way, an agent who progresses unusually quickly or slowly through a call, or who is directed into a branch of the script which is likely to significantly affect the call duration, will cause such events to be notified to the predictive dialler. When the script eventually finishes, as detected in decision 74, the call will end, this event will similarly be notified to the aggregator, which indicates to the predictive dialler that the agent is entering the wrap up/idle time and is expected to become free in a known period. Because this event will have been foreseen more accurately than the previously, the likelihood that the predictive dialler has balanced the number of dialled calls with the number of agents becoming free is greatly increased.

The additional steps used by the predictive dialler to adjust the call dialling rates are illustrated in FIG. 3. The predictive dialler employs an algorithm which is based on a conventional algorithm, which is well known to a skilled person. Such conventional algorithms operate to predict the time at which an agent will become free following termination of the call, wrap up and allowed idle time. Such algorithms maintain, for each active call, an indication of the time at which the agent will become free, or a clock is used to countdown towards that expected time at which the agent will become free. In such conventional algorithms, the expected time for the agent to become free is fixed throughout the call duration, based on a prediction made according to the campaign and/or agent in question. The only adjustment to this expected time occurs when the call ends, as it is then known that the wrap up and idle time will complete in (say) 15 seconds.

The process of FIG. 3 begins in a similar way, receiving a notification that a call has been connected to a particular agent, step 80. The predictive dialler software consults campaign and agent averages for call duration, step 82, and makes an estimate of the time to completion of the call, step 84.

The connection of the call to the agent is one of the events used as an input for the algorithm, step 86. When the estimated time to completion of the call has been calculated, this is also input to the algorithm, step 86, as in conventional predictive algorithms.

When each event notification is received, indicating further progress through the script, step 88, the predictive dialler updates the estimated time to completion of the call, step 90 and notifies this updated estimate to the algorithm in step 86. Thus, whereas conventional algorithms are only notified of the call commencement, the estimated time to completion, and the call termination, this algorithm is provided with variations to the estimated time to completion as the call progresses. When each such updated estimate is provided, the current outbound call rate can be adjusted to take account of the new estimated time to completion, in step 92.

The process continues in this way as further event notifications of progress through the script are received, step 94, with each such relevant event leading to an updated estimate, step 90. When notification is received that the script or call has been completed, step 96, a wrap up time for that agent is estimated, step 98, and this is notified to the algorithm in step 86.

The skilled person will appreciate that by varying the estimated time of outbound call rates, an improved management of a call centre can be obtained, with consequent increases in efficiency for the call centre and less likelihood of breaching regulatory limits on the number of dropped calls.

Further use for the event notifications is shown in FIG. 4. This process is carried out in software running within a supervisor workstation. The software subscribes to the aggregator for call progress events (i.e. trigger events based on the outbound campaign script as described previously), step 100. In step 102, a supervisor can input into the software application a definition of combinations of agent identifiers and particular script trigger events, step 102, such events when occurring on the specified agent's workstation, being referred to herein as "flag" events.

As each agent works through the script on each call, the trigger events specified in the campaign script are notified to the aggregator, as described previously, step 104. The software application running on the supervisor workstation may subscribe for all such events, or may only subscribe for a limited sub-set of events. The subscription can be placed on the supervisor's input on step 102. In preferred embodiments, the supervisor workstation will subscribe for all events, and this will then allow the supervisor to filter for flag events based on the input in step 102.

Thus, the supervisor's workstation application receives an updated status of each call's progression, step 106, and of the occurrence of a flag event, step 108. Matching the specified trigger event and agent identifier in step 102, various possibilities are available, depending on the wishes of the system designer. First, the supervisor can be alerted by an alert appearing on the screen of the supervisor workstation, step 110. Alternatively, or additionally, an automated call recorder can be conferenced into the call automatically step 112. As a further alternative or additionally, the supervisor may be conferenced automatically into the call, step 114.

The skilled person will appreciate that in conventional systems, call monitoring is either conducted on a random basis, or the supervisor must listen to an agent's call without knowing in advance whether or not the agent will reach the point in the script in which the supervisor has a particular interest. By employing the agent's workstation to notify trigger events to the supervisor's workstation (using, in this embodiment, the intermediary of the event notification aggregator), improved supervision can be achieved.

It should be appreciated that the event notification aggregator can be omitted, and the supervisor workstation can subscribe directly to each agent workstation to be notified of events, or a subscription module may not be employed, and instead communication systems are set up between the various pieces of software to ensure event notifications arriving at the supervisor workstation from the agent workstations.

In FIG. 5, improved real time statistics are generated according to the illustrated process. A statistics generation application (or "statistics package") is provided within the contact centre. Conventionally, such statistics have been generated on a historical basis, e.g. during agent wrap up, data from the call is notified to the statistics package, which collates and aggregates the statistics for presentation to supervisors and for later reporting purposes.

In FIG. 5, the statistics package subscribes to the aggregator for call progress events, step 120. A statistics designer defines statistics of interest based on script events, step 122. The statistic definitions may be revised frequently, in particular when outbound campaigns are being modified in competitive environments to optimise the effectiveness of the scripts. In such cases, the supervisors may wish to obtain information as to where the "sticking points" are for customers, e.g. if the wording of an offer is changed, do customers progress more frequently to the point of enquiring about price? If the customer enquires about price, does the progress of the script indicate resistance to that price? What happens if the wording "discounted price" is substituted for "low price" in the script? In this way, the events within the modified script can be flagged as important for statistical monitoring purposes in step 122.

When an event is notified to the aggregator, step 124, the statistics package receives an updated status of the call's progression, step 126 as previously described. This is used to update the real time statistics, assuming that the event in question is defined as having an impact on the collation of statistics, step 128. Such statistics may optionally be notified to the supervisor's workstation, step 130.

In this way, the operation of the call centre in real time can be monitored, and the generation of statistics can be varied in a more useful and time effective manner.

The invention is not limited to the embodiments described herein but can be amended or modified without departing from the scope of the present invention.

The invention claimed is:

1. A method of monitoring a communication session performed by a computing system in a contact center, comprising the steps of:
   providing to an agent at an agent station of said contact center a structured workflow for use by said agent in progressing said communication session in a structured fashion;
   defining one or more trigger events associated with steps in said structured workflow other than the connection and disconnection of said communication session;
   determining in advance of said communication session a performance metric of said agent which has been at variance with an average of the performance metrics of a group of agents at other agent stations of said contact center after reaching one of said steps in said structured workflow during previous communication sessions;
   during said communication session involving said agent station, monitoring the progress of said communication through said structured workflow to thereby detect the occurrence of one of said trigger events which is associated with said one of said steps; and
   upon detection of said one of said trigger events, issuing an event notification identifying said trigger event to an event-receiving service of the contact center which has been configured to receive such event notifications.

2. A method as claimed in claim 1, wherein said monitoring of the progress of the communication comprises detecting inputs from an agent at said agent station.

3. A method as claimed in claim 2, wherein said inputs are detected from the content of the communications session.

4. A method as claimed in claim 2, wherein said inputs are detected from an interaction of said agent with a workflow application interface provided at said agent station.

5. A method as claimed in claim 1, wherein said event-receiving service receives said event notifications from a plurality of agent stations and makes said event notifications available to other contact center services or entities.

6. A method as claimed in claim 5, wherein said event-receiving service enables said other contact center services or entities to subscribe to receive event notifications which match predetermined criteria.

7. A method as claimed in claim 1, further comprising the step, taken by an outbound dialer of the contact center, of adjusting an outbound dialing rate in response to said trigger event.

8. A method as claimed in claim 7, wherein said outbound dialer is said event-receiving service of the contact center to which said event notification issues.

9. A method as claimed in claim 7, wherein said outbound dialer communicates with said event-receiving service of the contact center to which said event notification issues.

10. A method as claimed in claim 7, wherein said outbound dialer maintains for said communications session an expected call duration value and wherein said outbound dialer adjusts said expected call duration estimate in response to the progress of the communications session as indicated by the event notification.

11. A method as claimed in claim 10, wherein said outbound dialling rate is determined by an algorithm having as an input said expected call duration estimate, whereby adjustment of said expected call duration estimate results in an adjustment of said outbound dialling rate.

12. A method as claimed in claim 1, further comprising the step of causing said communications session to be recorded in response to said event notification.

13. A method as claimed in claim 1, further comprising the step of conferencing into said communications session a supervisor in response to said event notification.

14. A method as claimed in claim 1, further comprising the step of issuing an alert at a supervisor station in response to said event notification.

15. A method as claimed in claim 1, further comprising the step of inputting said event notification into a statistical application which maintains real-time statistics relating to a plurality of contact center communications sessions based on said event notifications.

16. A computer program product comprising a non-transitory computer-readable medium encoding instructions which, when executed in a computing system of a contact center, are effective to cause said computing system to:
   provide to an agent at an agent station of said contact center a structured workflow for use by said agent in progressing said communication session in a structured fashion;
   define one or more trigger events associated with steps in said structured workflow other than the connection and disconnection of said communication session;
   determine in advance of said communication session a performance metric of said agent which has been at variance with an average of the performance metrics of a group of agents at other agent stations of said contact center after reaching one of said steps in said structured workflow during previous communication sessions;
   during said communication session involving said agent station, monitor the progress of said communication through said structured workflow to thereby detect the occurrence of one of said trigger events which is associated with said one of said steps; and
   upon detection of said one of said trigger events, issue an event notification identifying said trigger event to an event-receiving service of the contact center which has been configured to receive such event notifications.

17. A system for monitoring a communication session in a contact center, comprising:
   a structured workflow provided to an agent at an agent station of said contact center for use by said agent in progressing said communication session in a structured fashion, said workflow having identified therein one or more trigger events associated with steps in said structured workflow other than the connection and disconnection of said communication session;
   an input for receiving a determination made in advance of said communication session that a performance metric of said agent has been at variance with an average of the performance metrics of a group of agents at other agent stations of said contact center after reaching one of said steps in said structured workflow during previous communication sessions;
   a communication session monitor which is configured to monitor the progress of said communication through said structured workflow to thereby detect the occurrence of one of said trigger events which is associated with said one of said steps; and
   an event notification mechanism for issuing an event notification upon detection of said one of said trigger events, identifying said trigger event to an event-receiving service of the contact center which has been configured to receive such event.

* * * * *